July 14, 1953

C. R. GLANVILLE ET AL
METHOD AND APPARATUS FOR DETERMINING
CHARACTERISTICS OF EARTH FORMATIONS
Filed March 9, 1951

2,645,752

ATTEST:

*Clarence R. Patty, Jr.*

INVENTORS
Charles R. Glanville
Henry F. Dunlap
Ellis W. Shuler, Jr.

BY

ATTORNEY

Patented July 14, 1953

2,645,752

UNITED STATES PATENT OFFICE 2,645,752

METHOD AND APPARATUS FOR DETERMINING CHARACTERISTICS OF EARTH FORMATIONS

Charles R. Glanville, Henry F. Dunlap, and Ellis W. Shuler, Jr., Dallas, Tex., assignors to The Atlantic Refining Company, Philadelphia, Pa., a corporation of Pennsylvania Application March 9, 1951, Serial No. 214,800

5 Claims. (Cl. 324—30)

1

This invention relates to method and apparatus for determining permeability and formation resistance factor of earth formations, and particularly to method and apparatus for making such determinations from relatively small cuttings taken from such formations.

In order to determine whether or not hydrocarbons are present in earth formations, and also to determine the ease with which any hydrocarbons which are present may be removed, it is necessary that certain characteristics of the formation be measured. Among these characteristics is that of formation resistance factor. The formation resistance factor, as is well known in the art, is the ratio of the resistivity of a sample of the formation which is 100% saturated with a brine solution to the resistivity of the saturating brine. By correlation of the formation resistance factor with certain electrical measurements made on the formation in its native state, an estimate can be made as to the likelihood of the presence of hydrocarbons in the formation.

Heretofore formation resistance factor has been obtained by making the necessary measurements upon core samples obtained from the formation undergoing test by means of a special core drilling tool. There are undeniable advantages to working with core samples of relatively large and uniform size, but the obtaining of such samples is an expensive, and often difficult, undertaking. The securing of a core sample always necessitates removal of the tool string and replacement of the drilling bit with a special core bit, running the core bit into the hole to secure a sample, withdrawing it, and replacing the drill bit prior to continuing the drilling operation. It will be seen that such an operation is an expensive and time consuming one, particularly in the case of the investigation of formations several thousands of feet below the earth's surface. In addition to the fact that the securing of core samples is always a difficult task at best it frequently occurs that, due to the nature of the formation undergoing examination, it is impossible to obtain a suitable core sample.

Accordingly, it is one object of this invention to provide method and apparatus whereby the resistance factor of a formation may be determined without the necessity of obtaining core samples from the formation.

It is another object of this invention to provide method and apparatus whereby formation resistance factor determinations may be made from cuttings of a formation, which cuttings are

2 broken loose from the formation in the ordinary course of drilling and are brought to the surface of the earth with the returning drilling fluid.

It is another object of this invention to provide a method whereby cuttings from a formation may be mounted in a non-porous, non-conducting material in order to facilitate the making of formation resistance factor determinations.

Other objects and advantages of this invention will become apparent from the following detailed description taken in connection with the appended drawings.

Briefly, this invention relates to method and apparatus whereby formation resistance factor determinations may be made where, for one reason or another, only ordinary drill cuttings or other small fragments of the formation are available, although the invention may also be practiced, if desired, where cores are obtainable.

According to this invention, cuttings or other small fragments of the formation are imbedded, or bonded, in a mass of fluid-impervious, electrically-insulating, supporting material. The body thus formed of the cuttings and supporting material is then shaped into a wafer of any desired size and shape, and material removed from the faces of said wafer so as to expose surfaces of the cuttings at both faces. The wafer is preferably made in the form of a disk, but any other shape can be used.

In making formation resistance factor determinations, the wafer is washed to remove all foreign matter from the imbedded cuttings, which are then saturated with brine. The wafer is then mounted in a suitable holder and a current of electricity passed therethrough while the voltage drop thereacross is measured. Since the supporting material is a non-conductor of electricity, the voltage drop across the wafer serves as a measure of the resistance of the cuttings. This data, plus a knowledge of cuttings dimensions and brine resistivity, will permit formation resistance factor of the cuttings to be calculated.

Figure 1:
Figure 1 is a perspective view of a disk, used in accordance with the teachings of this invention, which comprises cuttings from a formation imbedded in a fluid-impervious, electrically-insulating supporting material.

In the drawings Figure 1 shows a wafer, preferably disk-shaped, generally designated by the numeral 1, which is composed of one or more cuttings 2 imbedded in a body 3 of fluid-impervious, electrically-insulating, and preferably transparent material. Materials which have been found to perform satisfactorily for this purpose are methyl methacrylate, more commonly referred to by the trade name "Lucite," and polystyrene.

In making wafer 1, samples of drill cuttings from a desired formation are selected so as to be at least 0.5 cm. thick and .05 square cm. in cross-sectional area. The selected cuttings are cleaned of hydrocarbons in any desired manner as by flushing them with a hydrocarbon solvent, such as naphtha, and then dried in an oven at 212° F. for several hours to evaporate the hydrocarbon solvent and any moisture which might be present in the pores of the samples. After cleaning, the edges and at least one face of the more irregular cuttings are sanded so that the edges will be substantially perpendicular to the face. The cuttings having thus been cleaned and sanded are ready to be mounted in the supporting material.

For this purpose a mold, not shown, of any desired size or shape, but preferably circular and of a diameter of one inch, may be used. A small amount of Lucite powder, preferably enough to form a wafer about $\frac{1}{16}$" thick, is placed in the bottom of the mold and subjected to a pressure of 1,000 p. s. i. and a temperature of 210° F. for a sufficient time (approximately one-half to one minute) to cause it to become partially polymerized. Thereafter, one or more of the previously prepared cuttings 2 are placed on the partially polymerized wafer in such manner that the edges of the several cuttings will be substantially perpendicular to the face of the wafer. The cuttings are then covered with Lucite powder to a depth of about $\frac{1}{8}$" above their upper faces. The contents of the mold are then subjected to a pressure of 1,000 p. s. i. and a temperature of 275° F. for approximately three to five minutes to thus form a wafer about $\frac{1}{4}$" thick consisting of the cuttings completely molded and encased in a fully polymerized Lucite body.

The faces of the wafer are then sanded, preferably with a heavy sandpaper until the full faces of all cuttings are exposed on each side of the wafer. Thereafter a fine sandpaper may be used to polish both faces of the wafer. Care should be taken that the wafer is not sanded so thin as to be excessively fragile and hence likely to break during subsequent handling. In the case of a wafer 1" in diameter it has been found that the wafer should not be sanded to a thickness of less than about .05 cm.

After completing the mounting, the cuttings mounted in the wafer are washed to remove foreign matter and then saturated with brine by means well known to those skilled in the art.

Figure 2:
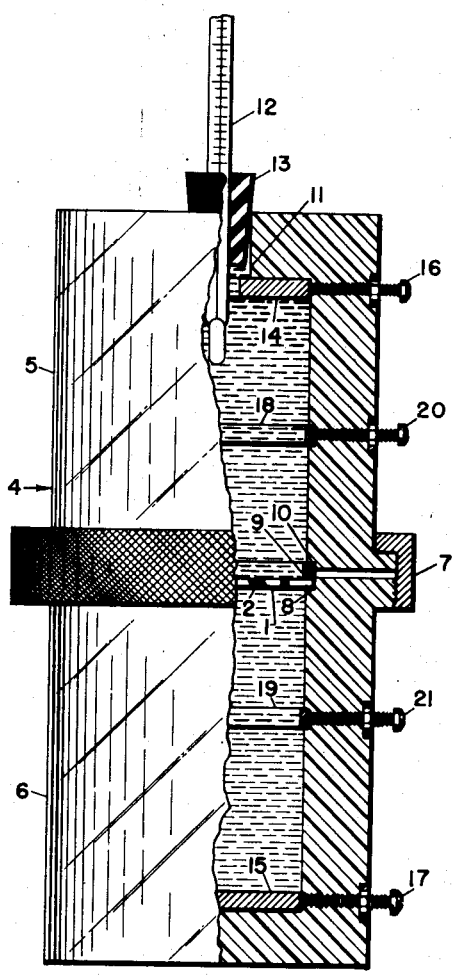
Figure 2 is an elevation, partially in section, of an apparatus designed for use in making formation resistance factor determinations in accordance with the method of this invention.

By using apparatus shown in Figure 2 a wafer, or disk, as described above and shown in Figure 1 may be employed for making formation resistance factor determinations. In this drawing, a wafer 1 is shown clamped in a cell 4 having upper and lower body sections 5 and 6, respectively, which are clamped together by any suitable means such as threaded connector ring 7. Body sections 5 and 6 are made of an electrically insulating material, such as Lucite. Wafer 1 rests on an internal annular shoulder 8 provided at the upper end of the inner periphery of lower body section 6. A sealing ring 9 made of any suitable non-conducting resilient material, such as rubber, is located atop wafer 1 and in contact with the outer edge thereof so as to form a seal therewith. The upper edge of resilient ring 9 makes sealing contact with annular shoulder 10 provided at the lower edge of the inner periphery of upper body section 5.

Prior to placing wafer 1 in cell 4, the cuttings 2 imbedded therein are saturated with brine by any process known to those skilled in the art. In assembling wafer 1 in cell 4, both upper and lower sections 5 and 6 are filled with a brine like that used to saturate the cuttings 2. The seal between wafer 1, shoulders 8 and 10, and resilient ring 9 prevents the escape of brine from cell 4.

The upper end of upper section 5 is provided with an opening 11 through which a thermometer 12 may be inserted for the purpose of observing temperature of the brine in compartment 5. Any suitable means may be utilized to support the thermometer 12, as for instance rubber stopper 13. Disks 14 and 15 of an electrically conducting material are secured in the upper end of upper section 5 and the lower end of section 6, respectively, disk 14 being provided with an opening to permit thermometer 12 to pass therethrough. Screw contacts 16 and 17 are employed to provide a path for electricity, through the walls of cell 4 to the exterior thereof, from disks 14 and 15 respectively. Ring 18, also of conducting material, is located in compartment 5 intermediate the ends thereof, and conducting ring 19 is located in compartment 6 intermediate its ends. Screw contacts 20 and 21 serve as external contacts for rings 18 and 19, respectively.

In operation, a measured current is passed through cell 4 between contacts 16 and 17, while the voltage drop between contacts 20 and 21 is measured. The temperature within cell 4, as indicated by thermometer 12, is observed at the same time. After correction for the resistance of the brine between rings 18 and 19 on opposite sides of wafer 1, the voltage drop between contacts 20 and 21 serves as an indication of the resistance of the brine-saturated cuttings 2, which may be used together with the temperature reading and the dimensions of cuttings 2 to determine the formation resistance factor of the formation from which the cuttings were taken, by calculations known to those skilled in the art.

While the method of measuring the thickness and cross-sectional area of the cuttings 2 included in any disc 1 forms no part of the present invention, it is suggested that the thickness be measured by means of an ordinary micrometer caliper. The cross-sectional area may be most accurately determined by making an enlargement of the disc by any suitable means, such as photographically, and measuring the area of the cuttings by means of a planimeter. Alternatively, this cross-sectional area of the cuttings may be measured photoelectrically by comparing the amount of light transmitted through a disc 1 carrying cuttings 2 to the light transmitted through a disc of similar material in which there are no cuttings, the amount of light transmitted being a function of the portion of the path obstructed. The difference in light transmitted by a clear disk and one having cuttings in it serves as a measure of the proportion of the light path obstructed by the cuttings and hence as a measure of the cross-sectional area of said cuttings.

While the above specification and drawings describe preferred method and apparatus for carrying out this invention, it will be appreciated by those skilled in the art that numerous minor

We claim:

1. A wafer for use in measuring the characteristics of an earth formation which comprises a cutting from said earth formation and a mass of fluid-impervious, electrically-insulating material surrounding said cutting, the upper and lower faces of said cutting being flush with the upper and lower surfaces respectively of said mass.

2. A wafer for use in measuring the characteristics of an earth formation which comprises cuttings from said earth formation and a mass of fluid-impervious, electrically-insulating material laterally surrounding said cuttings, the upper and lower faces of each of said cuttings being flush with the upper and lower surfaces respectively of said material and the edges of said cuttings being substantially perpendicular to said faces.

3. A method of determining the resistance factor of a formation comprising the steps of obtaining cuttings from the formation, forming a cylinder of fluid-impervious, electrically insulating material around said cuttings in such manner as to form a substantially fluid-tight bond between said cuttings and said material, removing material from the ends of said cylinder to expose a face of each of said cuttings at each end of said cylinder, saturating said cuttings with brine solution, and measuring the resistance to flow of electric current through said cylinder.

4. A method for determining the resistance of an earth formation comprising the steps of obtaining cuttings from the earth formation, embedding said cuttings in a mass of fluid-impervious, electrically-insulating material to form a wafer in which said cuttings are bonded with said mass with only opposite parallel faces of said cuttings exposed on opposite sides, respectively, of said wafer, saturating the cuttings with an electrolyte, passing an electric current through the cuttings, and measuring the voltage drop thereacross.

5. A method for determining the resistance factor of an earth formation comprising the steps of obtaining cuttings from the earth formation, embedding said cuttings in a wafer of fluid-impervious, electrically-insulating material, exposing the surfaces of each of said cuttings at opposite faces, respectively, of said wafer, saturating the cuttings with an electrolyte, passing an electric current through the cuttings, and measuring the voltage drop thereacross.

CHARLES R. GLANVILLE.
HENRY F. DUNLAP.
ELLIS W. SHULER, Jr.

References Cited in the file of this patent
UNITED STATES PATENTS

| Number | Name | Date |
|---|---|---|
| 882,265 | Neall | Mar. 17, 1908 |
| 1,509,495 | Slepian | Sept. 23, 1924 |
| 1,545,186 | Henriksen et al. | July 7, 1925 |
| 1,856,680 | Williams et al. | May 3, 1932 |
| 2,460,534 | Richards | Feb. 1, 1949 |